US012725920B2

(12) United States Patent
Han et al.

(10) Patent No.: US 12,725,920 B2
(45) Date of Patent: Sep. 1, 2026

(54) MICROWAVE PHOTONIC SYSTEM AND METHOD FOR CANCELLING LEAKAGE INTERFERENCE OF PHASED ARRAY ANTENNAS

(71) Applicant: DALIAN UNIVERSITY OF TECHNOLOGY, Dalian (CN)

(72) Inventors: Xiuyou Han, Dalian (CN); Yicheng Du, Dalian (CN); Shuanglin Fu, Dalian (CN); Mingshan Zhao, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 251 days.

(21) Appl. No.: 18/658,855

(22) Filed: May 8, 2024

(65) Prior Publication Data

US 2025/0079701 A1 Mar. 6, 2025

(30) Foreign Application Priority Data

Aug. 29, 2023 (CN) ........................ 202311096232.7

(51) Int. Cl.
*H04B 10/2575* (2013.01)
*H01Q 1/52* (2006.01)
(Continued)

(52) U.S. Cl.
CPC ........... *H01Q 3/2676* (2013.01); *H01Q 1/523* (2013.01); *H01Q 3/28* (2013.01); *H01Q 3/36* (2013.01);
(Continued)

(58) Field of Classification Search
CPC ........................... H04B 10/2575; H04B 10/80
See application file for complete search history.

(56) References Cited

U.S. PATENT DOCUMENTS 11,683,115 B2 * 6/2023 Haraguchi ......... H04B 10/2575 398/43
2003/0052819 A1 * 3/2003 Jacomb-Hood ........ H01Q 25/00 342/354

(Continued)

FOREIGN PATENT DOCUMENTS

CN 111948614 11/2020

OTHER PUBLICATIONS

Everett et al.. "Soft null: many-antenna full-duplex wireless via digital beamforming". IEEE Transactions on Wireless Communications, vol. 15, No. 12, pp. 8077-8092, Sep. 2016.

(Continued)

*Primary Examiner* — Nathan M Cors
(74) *Attorney, Agent, or Firm* — MUNCY, GEISSLER, OLDS & LOWE, P.C.

(57) ABSTRACT

An apparatus and method for cancelling leakage interference of phased array antenna based on microwave photonic. The apparatus consists of a signal generation unit, a splitter, a beaming unit, a transmitting antenna, a receiving antenna, a microwave photonic channel construction array, a control unit, a combiner array, and a signal receiving unit. The receiving antennas are divided into several receiving subarrays, and the microwave photonic channel construction unit corresponds to each receiving subarray, respectively. For each receiving subarray, a reference channel is constructed by adjusting the array of amplitude adjustment unit, the array of time delay adjustment unit, and the array of phase adjustment unit in the microwave photonic channel construction array. Thus, the reference channel has the matched delay, equal amplitude response, and opposite phase response relative to the leakage interference channel, based on which the leakage interference of phased array antenna is cancelled.

3 Claims, 4 Drawing Sheets

(51) Int. Cl.

| | |
|---|---|
| ***H01Q 3/26*** | (2006.01) |
| ***H01Q 3/28*** | (2006.01) |
| ***H01Q 3/36*** | (2006.01) |
| ***H04B 1/10*** | (2006.01) |
| ***H04B 10/40*** | (2013.01) |
| ***H04B 10/80*** | (2013.01) |

(52) U.S. Cl.

CPC ....... *H04B 1/1036* (2013.01); *H04B 10/2575* (2013.01); *H04B 10/40* (2013.01); *H04B 10/80* (2013.01); *H04B 2210/006* (2013.01)

(56) References Cited

U.S. PATENT DOCUMENTS

2013/0169483 A1* 7/2013 Vidal Drummond ........................ H04B 10/25752 342/375
2013/0176165 A1* 7/2013 Middleton ........... H01Q 3/2676 342/175
2020/0028261 A1* 1/2020 Foo .......................... H01Q 3/36

OTHER PUBLICATIONS

Pan et al., "A digital-assisted self-interference cancellation for full-duplex phased array radar", 2019 IEEE International Symposium on Signal Processing and Information Technology, 2019, 5 pages.

Shi et al., "Photonics-based de-chirping and leakage cancellation for frequency-modulated continuous-wave radar system". IEEE Transactions on Microwave Theory and Techniques, vol. 70, No. 9, Sep. 2022, pp. 4252-4262, 2022.

* cited by examiner

MICROWAVE PHOTONIC SYSTEM AND METHOD FOR CANCELLING LEAKAGE INTERFERENCE OF PHASED ARRAY ANTENNAS

TECHNICAL FIELD

The present invention relates to the technical field of phased array antennas, and especially relates to a microwave photonic system and method for cancelling leakage interference of phased array antennas.

BACKGROUND

Phased array antennas are composed of multiple antenna elements arranged according to a specific pattern. By controlling the amplitude and phase of each antenna element, beamforming can be achieved. Compared to mechanical scanning array antennas, phased array antennas have the advantages of flexible beam pointing and fast scanning, making them widely used in new generation radars, broadband wireless communications, and other fields. Full-duplex phased array system utilizes the same frequency carrier for simultaneous transmission and reception of information. This effectively enhances spectrum utilization and increases channel capacity, fulfilling the demands of complex scenarios for detection, communication, and other applications. It is the direction of development for new generation phased array antenna technology. However, due to limited isolation between the transmission and reception antenna elements in full-duplex phased array system, the transmitted signal inevitably leaks into the reception elements. Usually, the power of leaked interference is much greater than the power of the received useful signal, resulting in the useful signal being overwhelmed by interference. In addition, excessive power leakage interference can cause amplifier saturation or even damage in the receiver. Therefore, effective measures must be taken to eliminate leakage interference and ensure the reliable operation of phased array antenna systems.

The method for cancelling leakage interference in phased array system to achieve full duplex has been proposed in prior art [1] (E. Everett, C. Shepard, L. Zhong, A. Sabharwal. "Soft null: many-antenna full-duplex wireless via digital beamforming". IEEE Transactions on Wireless Communications, Vol. 15, No. 12, pp. 8077-892 September 2016). This method eliminates interference through digital beamforming, which can prevent the saturation of receiver. Then, the residual interference is eliminated in the receiver through digital processing. However, in practical applications, the power of leakage interference is often greater than that of interest signal, and the only beamforming technique to reduce interference still leads to the saturation of receiver, which makes the cancellation process in digital domain impossible to operate.

The method for cancelling leakage interference in phased array system based on time-domain and frequency-domain segmentation has been studied in prior art [2] (C. Z. Shi, W. S. Pan, S. H. Shao, Y. X. Tang, F. Hu. "A system and method for cancelling broadband self-interference in phased array antennas by using frequency domain segmentation", CN202010841342, 2023). Broadband leakage interference of linear frequency modulation (LFM) signal is segmented in the time domain by utilizing the time-frequency relationship characteristic of LFM signal, which is equivalent to dividing the broadband interference into several narrowband interferences in the frequency domain, and then suppressing the interference in each segment. However, in practical conditions, it is difficult to achieve fast segment in time domain without time interval by using electric switches. In addition, this scheme relies on the time-frequency relationship of LFM signals to segment broadband signals, it is difficult to be applied to other modulation formats of broadband interference signals. Therefore, the flexibility of this scheme is limited.

The method for cancelling leakage interference in phased array system based on symmetric deployment of antennas has been studied in prior art [3] (W. S. Pan, Q. N. Zhang, P. Yao, X. J. Xia, C. Z Shi, C. X. Li, Y. F. Ye, P. Z. Cui, Y. Liu, Y. X. Tang. "A digital-assisted self-interference cancellation for full-duplex phased array radar", 2019 IEEE International Symposium on Signal Processing and Information Technology, 2019). By deploying the symmetrical phased array antennas, a simplified leakage interference cancellation architecture has been obtained, reducing the complexity of the RF interference elimination circuit design. The full-duplex phased array transceiver integrates radar detection and wireless communication functions into a single apparatus. However, this scheme only considers the operation scenario of multiple transmitting antennas and single receiving antenna, and the interference cancellation system is still much complex in the operation scenario of multiple transmitting antennas and multiple receiving antennas. In addition, the bandwidth and adjustment accuracy of electrical devices limit the capability of the scheme to eliminate broad bandwidth interference.

The method for cancelling leakage interference and de-chirping in phased array system based on dual-drive Mach Zehnder modulator has been studied in prior art [4] (T. Shi, D. Liang, M. Han, Y. Chen. "Photonics-based de-chirping and leakage cancellation for frequency-modulated continuous-wave radar system". IEEE Transactions on Microwave Theory and Techniques, Vol. 70, No. 9, pp. 4252-4262, 2022). The scheme utilizes a dual-drive Mach Zehnder modulator to achieve interference cancellation and de-chirping of echo signal. However, the adjustment of delay and amplitude is achieved in electronic domain. Due to the limitations of bandwidth and adjustment accuracy of RF devices, it is difficult to achieve high interference cancellation performance in wide frequency bands and large bandwidth. In addition, this scheme is only suitable for scenarios of one transmitting antenna and one receiving antenna, and it is difficult to resolve the problem of multi-path interference in phased array system.

SUMMARY

The invention provides a microwave photonic system for cancelling leakage self-interference of phased array antennas, which can effectively resolve the problem of multi-path leakage interference in full-duplex phased array system in the prior arts.

The technical solution of the proposed invention is as follows:

A microwave photonic system for cancelling leakage interference in phased array antenna consists of a signal generation unit 1, a splitter 2, a beamforming unit 3, a transmitting antenna 4, a receiving antenna 5, an microwave photonic channel construction array 6, a control unit 7, an array of combiner 8, and a signal receiving unit 9.

The microwave photonic channel construction array 6, corresponds one-to-one with each receiving subarray in receiving antennas. For each receiving subarray, construct a reference channel for interference cancellation. The reference channel and the leakage interference channel of the corresponding receiving subarray have matched delay, equal amplitude, and opposite phase.

The microwave photonic channel construction array 6, consists of N microwave photonic channel construction units. The microwave photonic channel construction unit consists of a multi wavelength laser source 10, an electro-optical conversion unit 11, a wavelength division demultiplexing unit 12, an array of amplitude adjustment unit 13, an array of optical delay adjustment unit 14, an array of phase adjustment unit 15, a wavelength division multiplexer unit 16, and an opto-electronic conversion unit 17. They are connected in sequence by optical fibers or integrated optical waveguides.

The signal generation unit 1, the splitter 2, the beamforming unit 3, and the transmitting antenna are connected in sequence by cables or microstrip lines.

The signal generation unit 1 is used to generate the microwave signal, which transmits to the splitter 2.

The splitter 2 divides the signal generated by the signal generation unit 1 into two parts, which transmit to the beamforming unit 3 as transmitting signals and to the microwave photonic channel construction array 6 as the reference signals for cancelling leakage interference;

The beamforming unit 3 adjusts the amplitude and phase of the transmitting signal of each antenna element, thereby achieving function of beamforming.

The control unit 7 controls the array of amplitude adjustment unit 14, the array of optical delay adjustment unit 15, and the array of phase adjustment unit 16 in the microwave photonic channel construction array 6 to generate a matched reference signal, according to the leakage interference channel response of the receiving subarray.

The combiner 8 in the array of combiner includes two input ports and one output port. The input ports are connected to the receiving antenna subarray and the microwave photonic channel construction array 6, respectively. The output port is connected to the signal receiving unit 9.

The signal receiving unit 9 samples and quantizes the received signal, analyses the target information, and provides feedback to the control unit 7 to achieve closed-loop feedback control.

The multi-wavelength laser source 10 is a multi-wavelength laser array or an optical frequency comb, etc., which generates multiple optical carriers with a certain wavelength interval.

The electro-optic conversion unit 11, consists of an electro-optic modulator and a driving control circuit. The electro-optic conversion unit modulates the reference signal from the splitter 2 onto multi-wavelength optical carriers to achieve electro-optic conversion.

The wavelength division demultiplexing unit 12 is a wavelength decomposer or a multi-channel optical filter, which is used to separate the optically carried microwave signals according to the wavelength to each subchannel. The optically carried microwave signals sequentially pass through the array of amplitude adjustment unit 13, the array of optical delay adjustment unit 14, and the array of phase adjustment unit 15 in each subchannel.

The array of amplitude adjustment unit 13 consisting of M-path adjustable optical attenuators, which have the function of adjusting the amplitude of the optically carried microwave signals.

The array of optical delay adjustment unit 14 consisting of M-path adjustable optical delay lines, which have the function of adjusting the delay of the optically carried microwave signals.

The array of phase adjustment unit array 15 consisting of M-channel adjustable phase shifters based on microwave photonic, which have the function of adjusting the phase of the optically carried microwave signals.

The wavelength division multiplexer unit 16 is a wavelength multiplexer or a coupler, which is used to combine the optically carried microwave signals and transmit them to the opto-electric conversion unit 17.

The opto-electric conversion unit 17 is a photodetector having opto-electric conversion function.

A microwave photonic method for cancelling leakage interference in phased array based on is characterized that the implementation steps are as follows:

The first step, the signal output from the signal generation unit 1 is fed to the input of the splitter 2. One of the outputs of the splitter 2 is fed to the input of the beamforming unit 3 as transmitting signal, and the other of the outputs of the splitter 2 is fed to the microwave photonic channel construction array 6 as reference signal. The beamforming unit 3 adjust the amplitude and relative phase of transmitting signal under command of the control unit 7. Then the transmitting signal is sent out through the transmitting antenna 4. At the meantime, the self-interference signal with high power leaks into the receiving antenna 5. Thus, the weak target echo signal is drowned out.

The second step, the receiving antenna 5 is divided into several receiving subarrays. The receiving subarray is used as the basic unit to process received signals.

The third step, reference signal from the output of splitter is fed to the microwave photonic channel construction array 6. In the microwave photonic channel construction unit-1, the reference signal is modulated on the multi-wavelength optical carrier via the electro-optic conversion unit 11. The optically carried microwave signals are fed to wavelength division demultiplexing unit 12, and separated according to wavelength. The optically carried microwave signals with different wavelengths are fed to the array of amplitude adjustment units 13, the array of delay adjustment unit 14 and the array of phase adjustment units 15 sequentially. After through the wavelength division multiplexing unit 16, the optically carried microwave signals are fed to opto-electric conversion unit 17. The RF reference signal is sent from the output of opto-electric conversion unit 17. Microwave photonic channel construction unit-2, microwave photonic channel construction unit-3, . . . , and microwave photonic channel construction unit-N have the same structure and function as microwave photonic channel construction unit-1.

The fourth step, according to the signal received by the subarray, the control unit 7 adaptively controls the array of amplitude adjustment units, the array of optical delay adjustment units and the array of phase adjustment units in the microwave photonic channel construction unit. Thus, the reference signal from the microwave photonic channel construction unit-1 has the matched delay, the same amplitude, and the opposite phase relative to the multipath interference signal.

The reference signal generated by the microwave photonic channel construction unit-2, the microwave photonic channel construction unit-3, . . . , and the microwave photonic channel construction unit-N are combined with the signals received by each subarray, respectively. The delay, amplitude, and phase of the multi-tap reference signals are controlled by the control unit 7 to satisfy the condition for cancelling multi-path leakage interference signals received from the respective subarrays by the multi-tap reference signals.

The fifth step, in the array of combiner 8, each multi-tap reference signal cancels out the leakage interference received by each subarray. Thus, the echo signal is recovered to the signal receiving unit 9, wherein the signal is processed and analyzed to provide the information of the target. The detection function of the target is completed.

The benefit of the invention:

(1) The receiving antennas of phased array are divided into several subarrays, and the leakage interference received by the subarrays is processed as a combined signal to be cancelled, effectively reducing the number of reference channels. This greatly reduces the complexity of the leakage interference cancellation system.

(2) A microwave photonic method is employed to construct a multi-tap reference channel and the delay, amplitude, and phase of the reference signal are adjusted in the optical domain. This method offers several advantages, including a wide range of operating frequency bands, a large bandwidth, and a high adjustment accuracy.

In the figures: 1, signal generation unit; 2, splitter; 3, beamforming unit; 4, transmitting antenna; 5, receiving antenna; 6, microwave photonic channel construction array; 7, control unit; 8, array of combiner; 9, signal receiving unit; 10, multi-wavelength laser source; 11, electro-optical conversion unit; 12, wavelength division demultiplexing unit; 13, array of amplitude adjustment unit; 14, array of time delay adjustment unit; 15, array of phase adjustment unit; 16, wavelength division multiplexing unit; 17, opto-electronic conversion unit.

DETAILED DESCRIPTION

Specific embodiments of the invention are further described by combining the drawings and the technical solutions.

Figure 1:
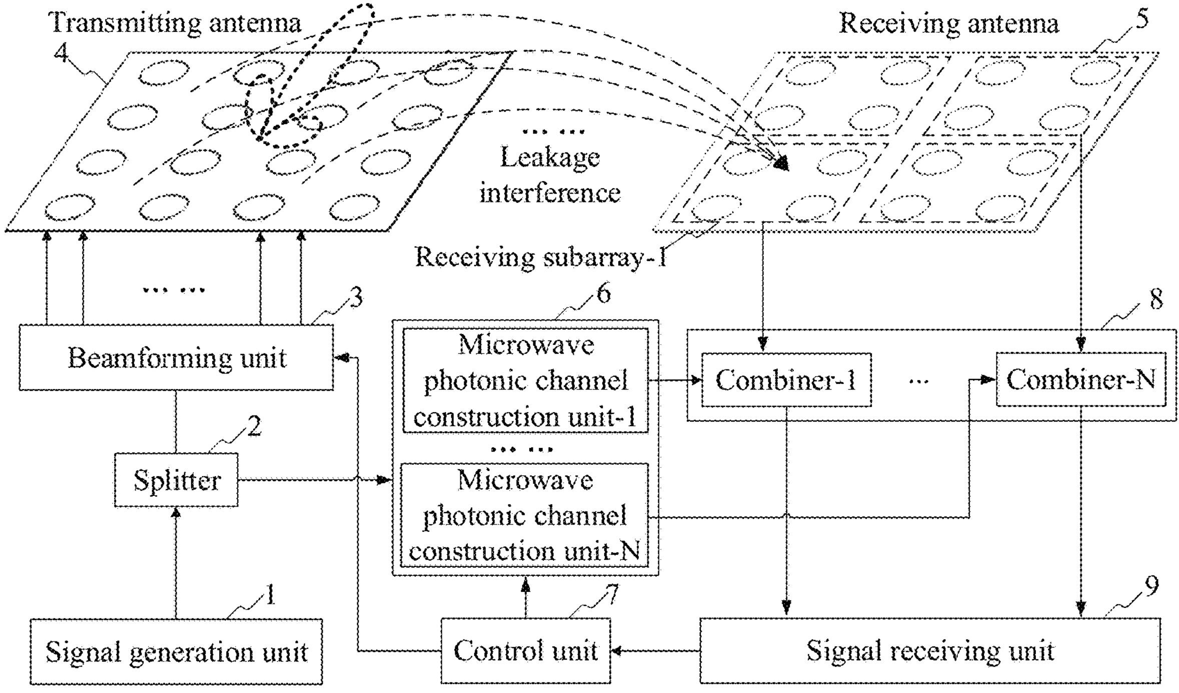
FIG. 1 is the structural diagram of microwave photonic leakage interference cancellation system for phased array antennas
Figure 2:
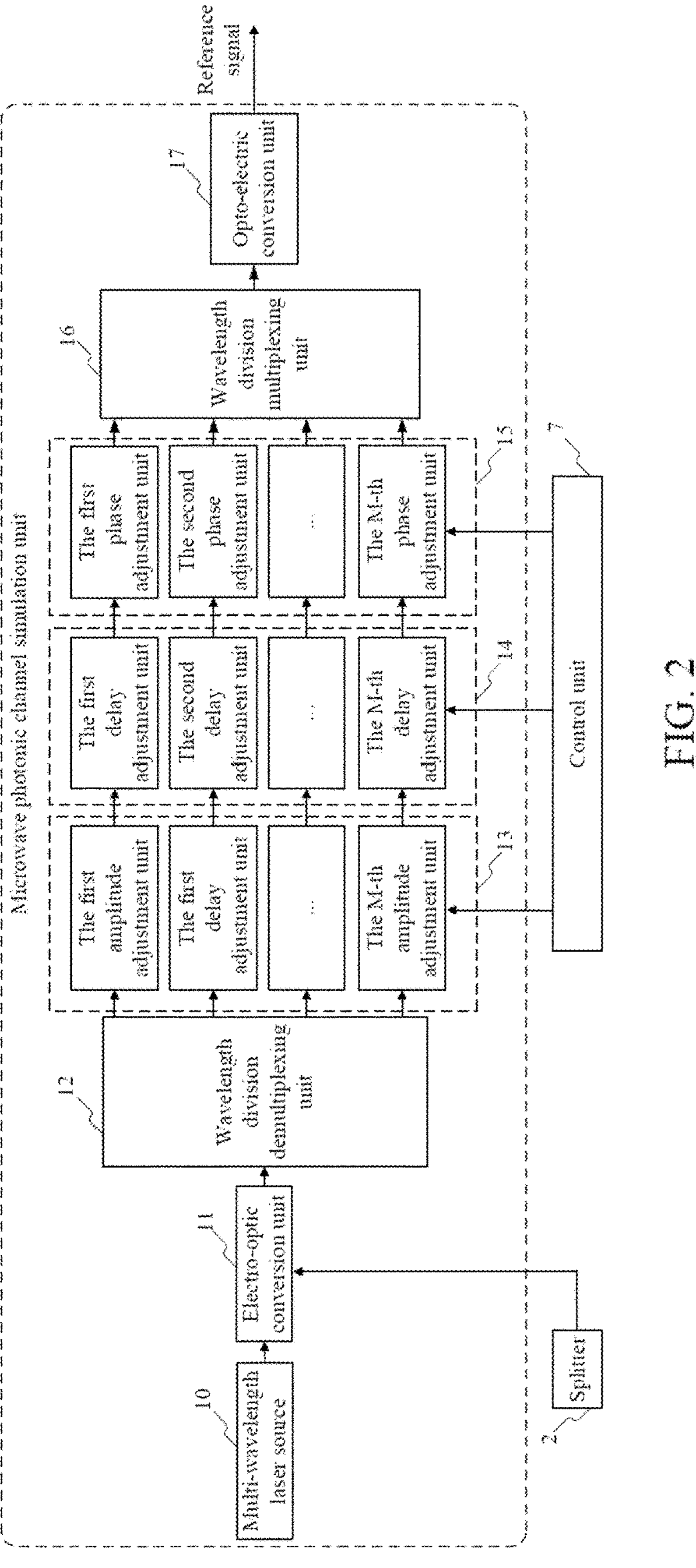
FIG. 2 is the structural diagram of the microwave photonic channel construction unit.

FIG. 1 is the structural diagram of microwave photonic leakage interference cancellation system for phased array antennas of the present invention. It is composed of a signal generation unit, a splitter, a beamforming unit, a transmitting antenna, a receiving antenna, a microwave photonic channel construction array, a control unit, a combiner array, and a signal receiving unit.

Each microwave photonic channel construction unit corresponds to the receiving subarray, according to the division of the receiving antenna. Reference channel is constructed for each receiving subarray to cancel out leakage interference.

The microwave photonic channel construction unit is composed of a multi-wavelength laser source, an electro-optical conversion unit, a wavelength division demultiplexing unit, an array of amplitude adjustment unit, an array of time delay adjustment unit, an array of phase adjustment unit, a wavelength division multiplexing unit, and an opto-electronic conversion unit. They are sequentially connected through optical fibers or integrated optical waveguides.

The control unit manages the array of amplitude adjustment units, the array of optical delay adjustment units, and the array of phase adjustment units in the microwave photonic channel construction array to reconstruct a matched reference channel. This is based on response of the leakage interference channel of the receiving subarray.

The combiner in the combiner array includes two input ports and one output port. One of the input ports is connected to the receiving subarray, and the other input is connected to the microwave photonic channel construction unit, respectively. The output port is connected to the signal receiving unit. The signal received by subarray contains multipath interference and echo. In the combiner, the multi-tap reference signal cancels out the multipath interference signal, and the echo signal is transmitted to the signal receiving unit. The signal receiving unit samples and quantizes the received signal, and the information of target can be analyzed from the received signal.

Figure 3:
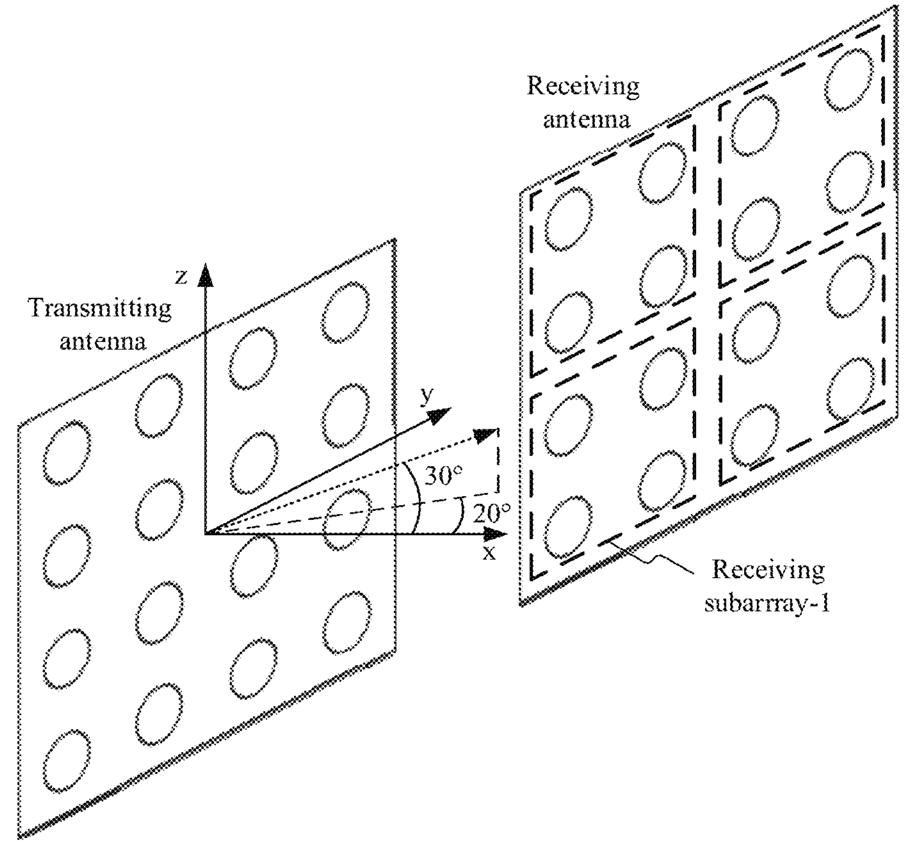
FIG. 3 is the schematic diagram of the element distribution of the transmitting antenna and receiving antenna, and the division of the receiving subarray.

The process of cancelling leakage interference of phased array antennas based on microwave photonic is as following:

For example, a phased array antenna with 4×4 transmitting and receiving elements as shown in FIG. 3, the transmitting antenna and receiving antenna are placed side by side. The antenna operates in the X-band, the center frequency is 9.5 GHZ, the bandwidth is 1 GHz, the spacing between the antenna arrays is 1.58 cm, and the transmitting beam has an azimuth angle of 20° and a pitch angle of 30°. The 4×4 receiving elements is divided into four 2×2 receiving subarrays. Receiving subarray 1 is used as an example to illustrate the implementation process of interference cancellation.

The signal s (t) generated by the signal generation unit is used as the transmitting signal and the reference signal. The beamforming unit control the amplitude and relative phase of the transmitting signal according to the beam pointing. Each element in the receiving subarray receives all the transmitting signal from the transmitting antenna, i.e., each receiving element receives 16 leakage signals, so that the leakage interference signal of the receiving subarray has 64 transmission paths.

Due to the different spatial locations of the transmitting antenna elements, each transmission path has a different propagation delay and amplitude attenuation. The leakage signals received by the subarray are combined to be the leakage interference signal x(t), i.e., the interference signals received by the four elements are combined into one interference signal and can be expressed as $$x(t)=\sum\nolimits_{m=1}^{4}\sum\nolimits_{n=1}^{16}\left|\alpha_{m,n}s(t-\tau_{m,n})\beta_n e^{i\varphi_n}\right| = s(t)*h(t) \tag{1}$$

where m denotes the m-th element in the receiving subarray. n denotes the n-th element in the transmitting antenna. $\alpha_{m,n}$ denotes the attenuation of the transmission path from the n-th element in the transmitting antenna to the m-th element in the receiving subarray. $\tau_{m,n}$ denotes the delay of the transmitting path from the n-th element in the transmitting antenna to the m-th element in the receiving subarray. $\beta_n$ is the gain of the n-th element in transmitting antenna. $\varphi_n$ denotes the additional phase shift of the n-th element in transmitting antenna. h(t) is the impulse response of the interference channel of the receiving subarray. The interference channel response of receiving subarray is $$H(f) = \frac{FFT[x(t)]}{FFT[s(t)]} \tag{2}$$

where FFT stands for Fourier transform. The microwave photonic channel construction unit is adjusted by the control unit to construct a reference channel response H'(f) that corresponds to the receiver subarray. The impulse response of the H'(f) is $$h'(t) = IFFT[H'(f)] \tag{3}$$

Ideally, the amplitude response of H(f) should be same as that of H'(f), while the phase response should be opposite, thus $$h(t) = -h'(t) \tag{4}$$

After passing through the microwave photonic channel construction unit, the reference signal s(t) is transformed into a multi-tap reference signal r(t)

$$r(t) = s(t) * h'(t) = -s(t) * h(t) \tag{5}$$

The reference signal and the leakage interference are combined in the combiner. From equations (1) and (5), it follows that $$r(t) + x(t) = 0 \tag{6}$$

The target echo signal can be recovered after the interference signals are eliminated.

Figure 4:
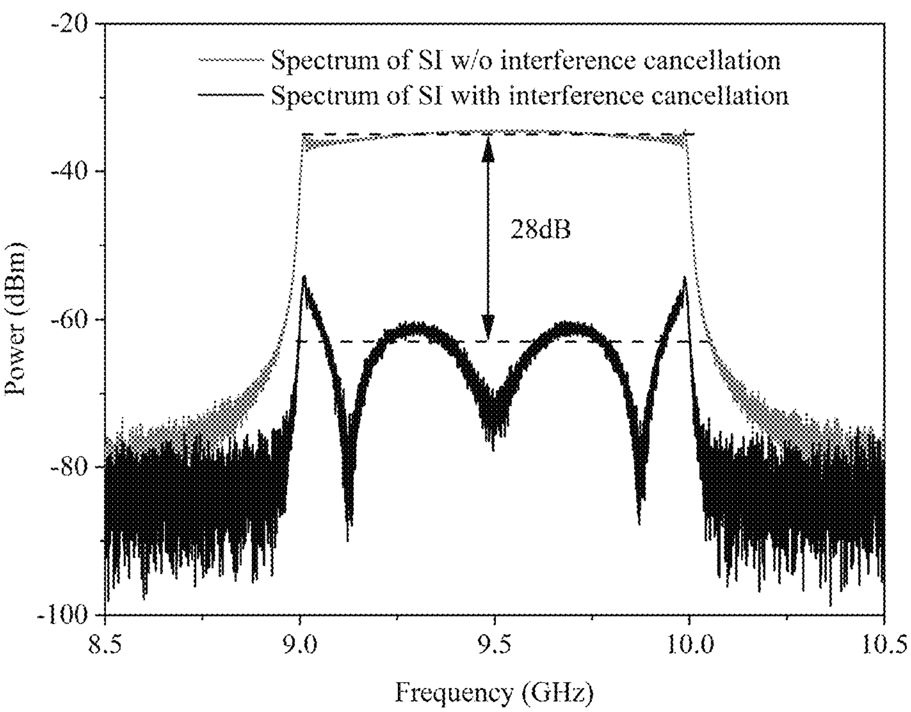
FIG. 4 is the spectrum of receiving signal before and after cancelling interference by 3-tap microwave photonic channel construction unit.
Figure 5:
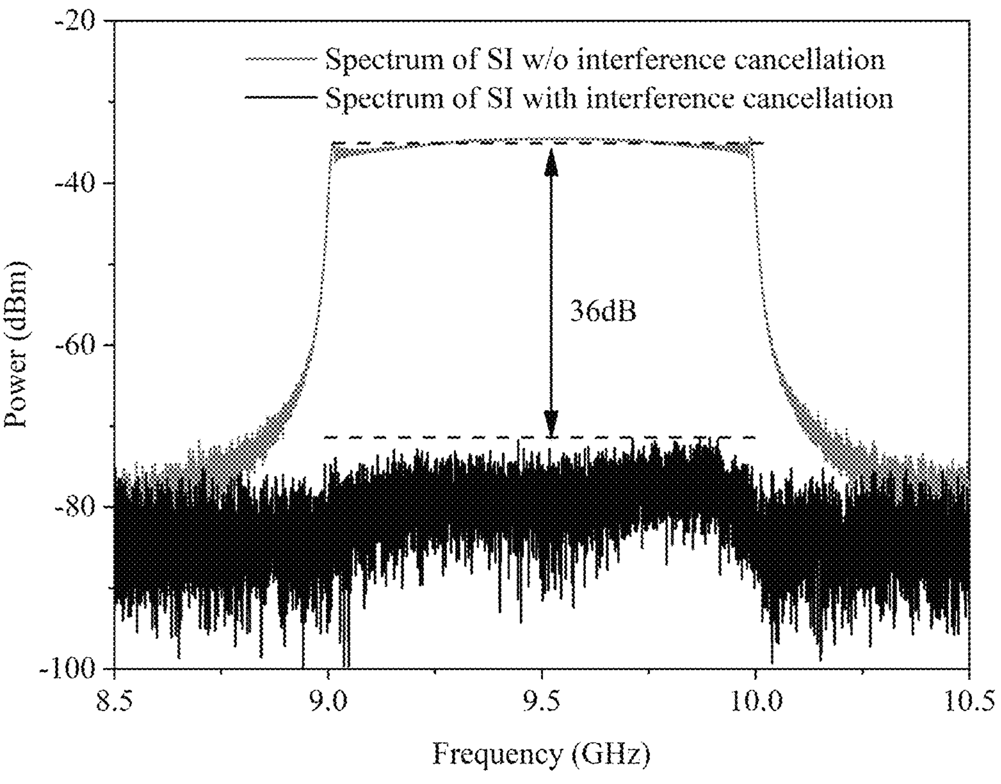
FIG. 5 is the spectrum of receiving signal before and after cancelling interference by 4-tap microwave photonic channel construction unit.

The microwave photonic channel construction unit with 3 taps and 4 taps, respectively are applied to construct the reference signal. Wherein, the array of amplitude adjustment unit, the array of time delay adjustment unit, and the array of phase adjustment unit have 3 channels and 4 channels, and the leakage interference cancellation performance are shown in FIG. 4 and FIG. 5, respectively. The depth of interference cancellation is defined as the ratio of in-band power before and after the leakage interference cancellation. As shown in FIG. 4, when the microwave photonic channel construction unit has 3 taps, depth of interference cancellation can reach 28 dB. As shown in FIG. 5, when the microwave photonics channel construction unit has 4 taps, the depth of interference cancellation can reach 36 dB.

Receiving subarrays 2, 3, and 4 are equivalent to receiving subarray 1 and undergo the similar processing. The output signals from all four combiners are input to the signal receiving unit, wherein the signals are processed and analyzed to provide the information of the target. The detection function of the target is completed.

The invention claimed is:

1. A system for cancelling leakage interference in phased array antenna based on microwave photonic, wherein the system consists of a signal generation unit, a splitter, a beamforming unit, a transmitting phased array antenna, a receiving phased array antenna, a microwave photonic channel construction array, a control unit, a combiner array, and a signal receiving unit;

the signal generation unit, the splitter, the beamforming unit, and the transmitting phased array antenna are sequentially connected by cables or microstrip lines;

the signal generation unit is used to generate a microwave signal, which transmits to the splitter;

the splitter divides the microwave signal generated by the signal generation unit into two parts, which transmit to the beamforming unit as transmitting signal and to the microwave photonic channel construction array as a reference signal for cancelling leakage interference;

the beamforming unit adjusts the amplitude and phase of the transmitting signal of each antenna element, thereby achieving function of beamforming;

the control unit controls an array of amplitude adjustment unit, an array of optical delay adjustment unit, and an array of phase adjustment unit in the microwave photonic channel construction array to generate a matched reference signal, according to a leakage interference channel response of a receiving subarray;

each combiner in the combiner array includes two input ports and one output port; the input ports are connected to a receiving antenna subarray and the microwave photonic channel construction array respectively; the output port is connected to the signal receiving unit;

the signal receiving unit samples and quantizes received signal, analyses target information, and provides feedback to the control unit to achieve closed-loop feedback control;

a multi-wavelength laser source is a multi-wavelength laser array or an optical frequency comb, which generates multiple optical carriers with a certain wavelength interval;

an electro-optic conversion unit, consists of an electro-optic modulator and a driving control circuit; the electro-optic conversion unit modulates the reference signal from the splitter onto multi-wavelength optical carriers to achieve electro-optic conversion;

a wavelength division demultiplexing unit is a wavelength decomposer or a multi-channel optical filter, which is used to separate an optically carried microwave signals according to its wavelengths to subchannels of a microwave photonic channel construction unit; the optically carried microwave signals sequentially pass through the array of amplitude adjustment unit, the array of optical delay adjustment unit, and the array of phase adjustment unit in each subchannel;

the array of amplitude adjustment unit consisting of M-path adjustable optical attenuators, which have the function of adjusting the amplitude of the optically carried microwave signals;

the array of optical delay adjustment unit consisting of M-path adjustable optical delay lines, which have the function of adjusting the delay of the optically carried microwave signal;

the array of phase adjustment unit array consisting of M-channel adjustable phase shifters based on microwave photonic, which have the function of adjusting the phase of optically carried microwave signals;

a wavelength division multiplexer unit is a wavelength multiplexer or a coupler, which is used to combine the optically carried microwave signals and transmit them to an opto-electric conversion unit;

the opto-electric conversion unit is a photodetector having opto-electric conversion function.

2. A system for cancelling leakage interference in phased array antenna based on microwave photonic according to claim 1, wherein the microwave photonic channel construction array corresponds one-to-one with each receiving subarray in receiving antenna; the microwave photonic channel construction array consists of N microwave photonic channel construction units; the microwave photonic channel construction unit consists of a multi wavelength laser source, an electro-optical conversion unit, a wavelength division demultiplexing unit, an array of amplitude adjustment unit, an array of optical delay adjustment unit, an array of phase adjustment unit, a wavelength division multiplexer unit, and an opto-electronic conversion unit; they are connected in sequence by optical fibers or integrated optical waveguides; for each receiving subarray, the microwave photonic channel construction unit constructs a reference channel with the matched delay, equal amplitude, and opposite phase relative to the leakage interference.

3. A system for cancelling leakage interference in phased array antenna based on microwave photonic, wherein the implementation steps are as follows:

feeding a signal output from the signal generation unit to the input of a splitter; one of the outputs of the splitter is fed to the input of the beamforming unit as transmitting signal, and the other of the outputs of the splitter is fed to the microwave photonic channel construction array as reference signal; the beamforming unit adjust the amplitude and relative phase of transmitting signal according to command of a control unit; then the transmitting signal is sent out through a transmitting antenna; at the same time, a self-interference signal with high power leaks into a receiving antenna;

dividing the receiving antenna into several receiving subarrays; the receiving subarray is used as the basic unit to process received signals;

feeding the reference signal from the output of splitter to a microwave photonic channel construction array; in microwave photonic channel construction unit-1, the reference signal is modulated on a multi-wavelength optical carrier via an electro-optic conversion unit; a optically carried microwave signals is fed to wavelength division demultiplexing unit, and separated according to wavelength; the optically carried microwave signals with different wavelengths are fed to an array of amplitude adjustment units, an array of delay adjustment unit and an array of phase adjustment units sequentially; after through a wavelength division multiplexing unit, the optically carried microwave signals are fed to opto-electric conversion unit, a multi-tap reference signal is output from opto-electric conversion unit; microwave photonic channel construction unit-2, microwave photonic channel construction unit-3, and microwave photonic channel construction unit-N have the same structure and function as microwave photonic channel construction unit-1;

according to the signal received by the subarray, the control unit adaptively controls the array of amplitude adjustment units, the array of optical delay adjustment units and the array of phase adjustment units in the microwave photonic channel construction array; thus, the reference signal from the microwave photonic channel construction unit-1 has the matched time delay, the same amplitude, and the opposite phase relative to multipath interference signal;

the multi-tap reference signal generated by the microwave photonic channel construction unit-2, the microwave photonic channel construction unit-3, and the microwave photonic channel construction unit-N are combined with the signals received by each subarray, respectively; the delay, amplitude, and phase of the multi-tap reference signals are controlled by the control unit to satisfy the condition for cancelling multi-path leakage interference signals received from the respective subarrays;

cancelling out the leakage interference received by each subarray using each multi-tap reference signal in array of combiners; thus, an echo signal is recovered to a signal receiving unit, wherein the signal is processed and analyzed to provide target information; a detection function of the target is completed.

* * * * *